United States Patent [19]
Valentine

[11] Patent Number: 5,122,353
[45] Date of Patent: Jun. 16, 1992

[54] REDUCTION OF SULFUR EMISSIONS FROM COAL-FIRED BOILERS

[76] Inventor: James M. Valentine, 480 Hemlock Rd., Fairfield, Conn. 06430

[21] Appl. No.: 669,670

[22] Filed: Mar. 14, 1991

[51] Int. Cl.$^5$ .................. B01J 8/00; C01B 17/00; F23B 7/00; F23B 11/00
[52] U.S. Cl. .................. 423/244; 423/242; 110/343; 110/345
[58] Field of Search .......... 423/244 A, 242 A, 242 R, 423/244 R; 110/343, 345

[56] References Cited

U.S. PATENT DOCUMENTS

| | | | |
|---|---|---|---|
| 4,061,476 | 12/1977 | Holter et al. | 55/77 |
| 4,086,324 | 4/1978 | Welty, Jr. | 423/235 |
| 4,440,100 | 4/1984 | Michelfelder et al. | 110/343 |
| 4,655,148 | 4/1987 | Winship | 110/347 |
| 4,702,899 | 10/1987 | Barczak et al. | 423/244 |
| 4,710,305 | 12/1987 | Allison et al. | 210/747 |
| 4,780,291 | 10/1988 | Sayler et al. | 423/244 |
| 4,960,577 | 10/1990 | Torbov et al. | 423/242 |
| 4,981,667 | 1/1991 | Berg et al. | 423/244 |

*Primary Examiner*—Gregory A. Heller
*Attorney, Agent, or Firm*—St. Onge Steward Johnston & Reens

[57] ABSTRACT

$SO_x$ reduction treatments involving sorbent addition to coal-fired boilers is improved by retrofitting the boiler to burn fuel oil-in-water emulsions as a replacement for at least a portion of the coal. The ratio $SO_x$ removed to particulates produced can be significantly increased.

14 Claims, 1 Drawing Sheet

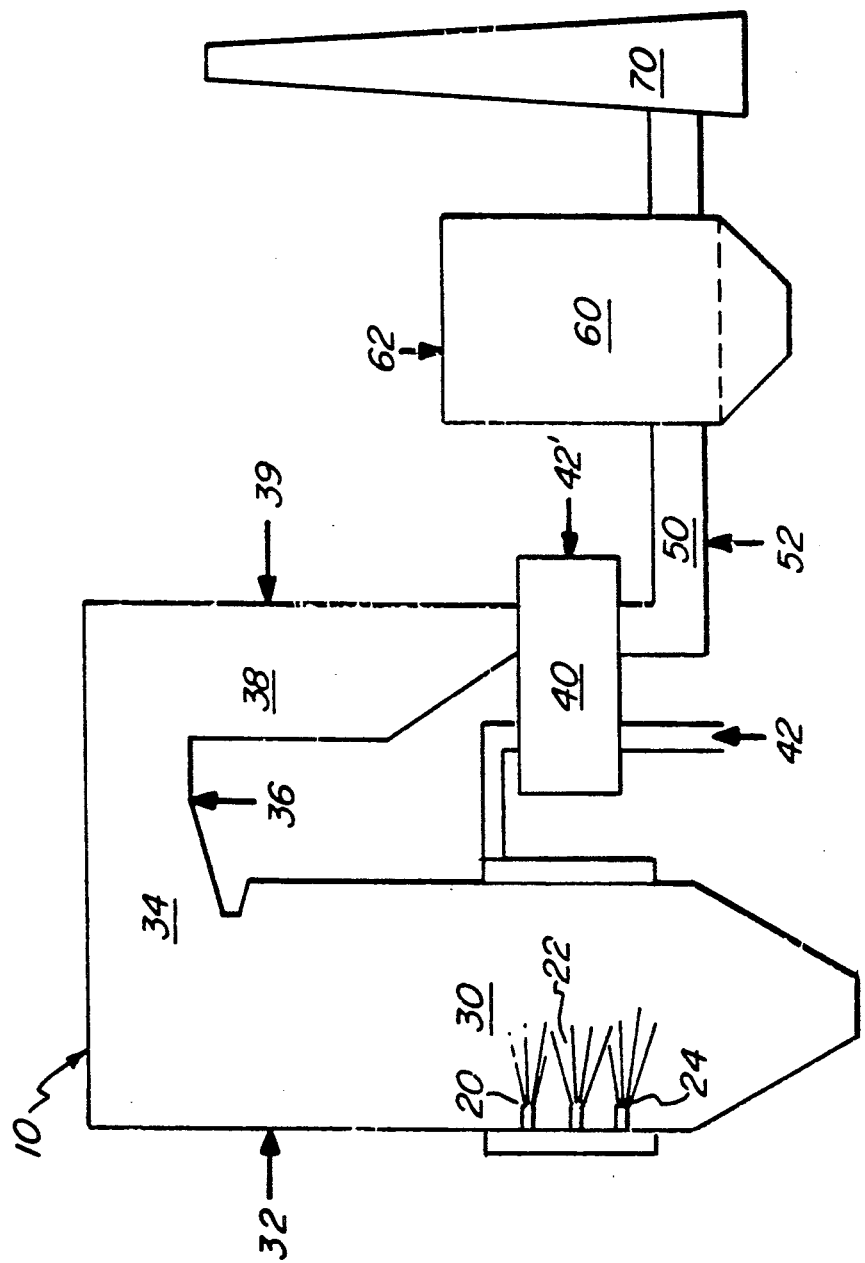

REDUCTION OF SULFUR EMISSIONS FROM COAL-FIRED BOILERS

TECHNICAL FIELD

The present invention provides a process for reducing the emissions of $SO_x$ from normally coal-fired boilers; especially, a process to accomplish practical levels of $SO_x$ reduction without producing particulates at levels which pose undue problems.

Coal is widely recognized as an economical fuel which holds future promise for low-emissions, clean-burning operations. Indeed, technology is being developed which will reduce sulfur and other adverse components of coal prior to burning. In addition, coal combustors are being designed for higher levels of combustion efficiency and lower levels of $NO_x$ and CO generation. Unfortunately, these new technologies are largely most effective and economical in new installations and cannot be implemented in many existing boilers in a cost effective manner.

There is a present need for a technology which can be applied to existing, often older, coal-fired boilers which could reduce $SO_x$ by environmentally significant levels despite limitations now thought inherent in the generation of particulates or the conversion to higher-cost, lower-sulfur coal.

BACKGROUND ART

Numerous techniques exist for the removal of $SO_x$ pollutants from the combustion gases of fossil fuels. These include the conventional wet and dry scrubbers (See for example, U.S. Pat. No. 4,061,476 to Holter et al. and U.S. Pat. No. 4,086,324 to Welty) as well as emerging techniques of furnace sorbent injection (FSI), (See, for example U.S. Pat. Nos. 4,440,100 to Michelfelder et al., 4,655,148 to Winski and 4,960,577 to Torbov et al. backend recycle of FSI products (e.g., U.S. Pat. No. 4,710,305 to Gebhard et al.) or in-duct injection of sulfur reducing sorbents.

In contrast to wet or dry scrubbers these emerging techniques offer significantly lower capital cost and require less space, however their chemical utilization is generally lower than scrubbers and their removal efficiency is typically in the 40 to 80% $SO_x$ range versus 95 to 99% removal for properly designed scrubber systems.

Under the new Clean Air Act, these emerging technologies may provide the opportunity for smaller, older coal-fired boilers that may be near the end of their economic lifetimes to meet the Phase I or Phase II $SO_x$ emission requirements without the capital investment required for wet or dry scrubbers.

One limitation to the broad application of these emerging $SO_x$ control techniques is the increased solids loading on the furnace tubes, backend heat exchanger surfaces, particulate collection devices and ash disposed systems that results from the reaction of sulfur sorbents with $SO_x$ in the flue gas. Typically sorbents will need to be added in a molar ratio of sorbent: sulfur in the range of 2 to 3, to effect a 50 to 70% $SO_x$ capture, translating into a sorbent utilization of only 25 to 40%. The resulting increase in particulate loading from the addition of sorbents and their reaction with gaseous $SO_x$ to form solid sorbent-sulfates can overwhelm the ability of the furnace and other systems to operate. Thus, the application of these $SO_x$ removal techniques has been limited to modest reductions (15 to 40%) or to low sulfur coal (e.g., 0.75% sulfur) applications. In other situations, costly upgrades to boiler particulate collection devices and ash handling may be required thus significantly raising the capital investment required.

In some situations it may be possible to fire lower sulfur coal, either alone or in combination with emerging $SO_x$ control techniques to meet $SO_x$ emission regulations. However, lower sulfur coal typically sells at a premium to moderate or high sulfur coal, is not economically available in all regions, and may impact furnace operation due to variations in heating value, ash and metals contents, and slagging characteristics.

DISCLOSURE OF INVENTION

It is an object of the present invention to provide an improved process for reducing $SO_x$ in coal-fired boilers.

It is a more particular object of one aspect of the invention to enable environmentally significant increases in reduction of $SO_x$ from existing coal-fired boilers at minimal increase in operating costs.

It is a more specific object of the invention in one embodiment to enable the increased reduction of $SO_x$ from an existing coal-fired boiler, in part, through the achievement of an increased ratio of $SO_x$ removed to solids (ash, sulfates and unreacted sorbent, as particulates) produced by the boiler.

These and other objects are accomplished according to the present invention which, in one aspect provides a process for decreasing $SO_x$ produced by a coal-fired boiler, the process comprising replacing at least a portion of the coal with an emulsified, pumpable fuel comprising a continuous water phase and a discontinuous fluid hydrocarbon phase and contacting the combustion effluent with a $SO_x$-reducing agent.

In particular, the invention provides a process for decreasing $SO_x$ produced by a coal-fired boiler comprising a plurality of burners, the process comprising: providing as at least one of the burners, a burner capable of burning an emulsified, pumpable fuel; supplying to at least one of said burners an emulsified fuel comprising from 10 to 70% of a continuous water phase and a discontinuous fluid hydrocarbon phase comprising at least 1% sulfur; burning said fuel, thereby creating a combustion effluent containing $SO_x$; and contacting the combustion effluent with a $SO_x$ sorbent selected from the group consisting of the hydroxides, oxides, and carbonates of calcium, magnesium, barium, sodium, and aluminum, and mixtures of these.

According to one embodiment, the invention provides a method for reducing $SO_x$ in a boiler having a coal burner to produce combustion gases, means for introducing $SO_x$-reducing agent for contact with the combustion gases, and means to remove particulates from the combustion gases which comprises: installing in the boiler at least one burner capable of burning an oil-in-water emulsion; and burning a sufficient quantity of oil-in-water emulsion to increase the ratio of $SO_x$ removed to particulates produced.

According to a preferred embodiment, the emulsion contains a bitumen as the oil phase, and in particular can be of the type based on Venezuelan bitumens having sulfur contents of over 2%, typically in the range of from 2.4 to 2.9%, and in this form are available commercially as Orimulsion. These fuels are referred to herein as fuel emulsions and typically have ash contents of less than 0.5%, e.g. 0.01 to 0.30%.

The SO$_x$ reduction can be achieved by introducing a precipitate forming agent at any point in the process (before or after combustion), in any physical form (wet or dry), and in any vehicle (air, water, or oil).

BRIEF DESCRIPTION OF THE DRAWINGS

The invention will be better understood and its advantages will be more apparent when the following detailed description is read in conjunction with the accompanying drawing, wherein:

The FIGURE is a schematic showing process configurations in accordance with the invention.

BEST MODE FOR CARRYING OUT THE INVENTION

The present invention is based on the realization that well documented and longstanding limitations in SO$_x$ reduction for coal-fired boilers can be mitigated, if not fully overcome, by the adoption of a specific class of fuels, without added cost, in at least partial replacement of coal.

The invention enables achieving higher SO$_x$ removal to particulate ratios than heretofore recognized as possible without resorting to expensive technologies for reducing sulfur content prior to combustion or the use of higher-cost low-sulfur coals.

The fuels (fuel emulsions) useful according to the invention are oil-in-water emulsions of highly-viscous, yet liquid (often with heating to reasonable temperatures. e.g. 25° to 100° C.) hydrocarbons. These fuels can be used in full or partial replacement of coal and include bitumens derived from any source, including the fields known to produce such in North America, Mexico, Venezuela and the Middle East. These bitumens typically have high densities, with API gravities as low as 10 degrees and less, e.g. about 7 to 9 degrees API. Sulfur contents of up to 5% are not uncommon, and of from 1 to 4% are typical. This can be present in the form of inorganic and/or organic sulfur, and the present invention can be employed to facilitate the use of bitumens containing either or both.

The bitumens can be passed to an emulsifier which can be any device effective for the purpose. The emulsions are preferably of the bitumen-in-water type and are referred to herein as fuel emulsions. It is also within the contemplation of the invention to employ emulsions which might be characterized also as either water-in-bitumen or complex, with the attributes of both types of emulsions. There are good reasons in some situations to employ one of these other emulsion forms.

Bituminous hydrocarbons, because of their highly viscous nature, typically require extraordinary means to remove them from wells. In the case of Orinoco crude from Venezuela, water and surfactants (sometimes with steam) is pumped into the wells to soften and emulsify the bitumen. The emulsions are pumped to the surface where the emulsions of bitumen in water are broken (typically by heating under pressure) separated into bitumen and water phases, and reemulsified. Emulsions of Orinoco crude are commercially available under the trademark Orimulsion. These are stable bitumen-in-water emulsions and do not normally require reemulsification prior to use according to the invention. This is, however, not a rigid rule, and there may be reason, for example, for removing at least a portion of the water phase and replacing it with one more compatible with the objectives of this invention.

Representative of the technology which can be employed to prepare emulsions of bituminous hydrocarbons is that described in U.S. Pat. Nos. 4,618,348, 4,684,372 and 4,886,519 all to Hayes et al., the disclosure of which is incorporated herein by reference.

In preparing suitable emulsions of bitumen in a continuous aqueous phase, the bitumen can be emulsified through the addition of any amount of water effective to form the emulsion. Typically, from 30 to 70% water (by volume of the final emulsion) is added (as by line 12) and the bitumen (added by line 14) is thoroughly and finely dispersed therein. Where greater amounts of water are desired (up to about 10 times these amounts, e.g., 2 to 5 times), it may be more efficient to add only a portion prior to emulsification, and simply blend in the remainder later. Effective dispersion is achieved by suitable devices, such as rotary (e.g., centrifugal pumps), mechanical, or static, dynamic or other emulsifying devices. Desirably the bitumen is heated to a fluid state prior to emulsification. Any one of a number of known chemical or biological surfactants can be added to ensure the stability of the bitumen-in-water emulsion, with water being the continuous phase.

It is preferred to obtain small droplet sizes effective to provide a high surface area for improved combustion. It is preferred to obtain mean droplet sizes below about 250 microns, and more preferably in the range of 10 to 100 microns. This size range allows effective surface area for burning while also assuring stability of the emulsion at reasonable energy input and surfactant levels. Desirably, less than 5% of the droplets will be in excess of 100 microns, and preferably this will be kept to less than 2%.

Among the effective SO$_x$-reducing agents are any of those materials known in the art which can be introduced prior to, during or subsequent to combustion to remove SO$_x$ and produce a separatable, solid containing the removed SO$_x$ in combined form. Suitable agents are calcium, magnesium, aluminum, barium, sodium and like salts, hydroxides and oxides effective for this purpose. The above-cited references are incorporated herein by reference in this regard. Particularly useful are the carbonates, hydroxides and oxides of calcium and magnesium and the naturally-occurring minerals such as dolomite containing one or both of these.

Where desired, the bitumen can be pretreated to remove sulfur as set forth in my copending U.S. patent application Ser. No. 616,610 filed Nov. 21, 1990, the disclosure of which is incorporated herein by reference. In accordance with that disclosure, the fuel can have soluble and/or insoluble SO$_x$-reducing agents in the fuel as supplied to the burner. These can be in the oil and/or the water phase.

The SO$_x$-reducing agents can be added, along with air or water, as needed into the combustion gases (e.g. into the furnace, a convective zone of a boiler or heat exchanger, or in duct work such as following an air heater), or they can be added as a part of the fuel, either in the oil or water phase or both. For example, see Figure which represents a commercial coal-fired boiler shown generally as 10, having a plurality of burners 20, 22 and 24 at least one of which is adapted to burning fuel emulsions according to the invention. For example, one or two burners, e.g. 20 and/or 22, can burn coal during low-load conditions with a third, e.g. 24, (and possibly 22) burning fuel emulsion under near full load conditions. By using one or more fuel emulsion burners at high load, existing boilers can be improved to remove more $SO_x$ by sorbent introduction than is possible when using all coal-fired burners. The $SO_x$-reducing agent can be injected at any suitable location between flame zone 30 and the stack 70. For example, it can be added as part of the fuel supplied to any of burners 20, 22 or 24 or the combustion air at any stage. Also it can be added to the furnace area such as at 32, the heat exchanger area 34 such as at 36, the convective pass area 38 such as at 39. It can also be added in air heater 40 on the exhaust side 42 or the air supply side 42,, in duct 50 as at 52, or to electrostatic precipitator 60 such as at 62. In some cases it is desirable to add some as a part of the fuel and some to the combustion gases. In other cases it can also be split between the oil and water phases. These approached are especially desired to achieve maximum effectiveness for chemicals and chemical forms which provide their highest impact at particular stages.

It is a novel feature of this invention that fuel emulsions can be fired in existing coal-fired boilers modified to combust a liquid fuel, either alone or in combination with coal and with the addition of $SO_x$-reducing agents, can reduce $SO_x$ emissions to acceptable levels without undue ash loading to the furnace, backend systems and environment..

This invention achieves major benefits of $SO_x$ reduction versus particulate loading despite the fact that fuel emulsions contain sulfur in the range of 2.4 to 2.9%, typically 2.7%. The solid particulates produced by the addition of $SO_x$-reducing chemicals plus the ash content of fuel emulsions (in the range of 0.04 to 0.30%, typically 0.21% by weight) is surprisingly low. This is in contrast to moderate to high sulfur coals which typically have sulfur contents of 0.75% to 3% or greater and ash contents to 6% to 12%. Hence even though fuel emulsions have a sulfur content comparable to a broad range of coals, the ash content is so low, i.e.: less than 0.3% that fuel emulsions can be burned with any of the emerging $SO_x$ removal technologies without producing a significant increase in ash loading to the furnace over that which results from the combustion of base coal without the addition of sulfur reducing sorbents.

In addition, the use of sorbents added to the fuel or FSI will have the added benefit of controlling slagging or corrosion from metals often found in bitumen, crude, residual fuels.

This invention removes a major hurdle to the use of low-cost, high-sulfur fuels through application of emerging $SO_x$ removal techniques on older and smaller coal-fired boilers; and has the additional benefit of lowering operating costs through the combustion of competitively priced fuel emulsions versus coal.

The following example is presented to further illustrate and explain the present invention and should not be taken as limiting in any regard. Unless otherwise indicated, all parts and percentages are by weight, and are based on the weight at the particular stage of the processing being described.

EXAMPLE 1

This example describes the reduction in $SO_x$ production by a coal-fired boiler.

In one operation, coal is fed to a series of coal burners in a 0.6 million Btu (MMBtu) test combustor. The coal has the following analysis:
Btu per pound 13,432
Moisture (%) 1.2
Sulfur (%) 2.8
Ash (%) 9.6

Upon combustion, the boiler produces 7.2 lbs/kg of ash for each million Btu of coal fired and resulted in a $SO_x$ level of 4.2 lbs/MMBtu. By injecting a slurry of 20% calcium carbonate at a Ca: S ratio of 2.2 into the furnace, the $SO_x$ was reduced by 60% A total of 18.6 lbs of waste was collected for each MMBtu of coal fired. This represents a 158% increase over the base coal ash loading of 7.2 lbs/MMBtu, or 2.5 times the solids loading of the base coal without sorbent. Thus the ratio of $SO_2$ removed to particulates generated is 0.135 lbs $SO_2$/lb particulates.

As a comparison, an emulsified fuel available commercially as Orimulsion and having the following analysis is burned:

|  | Parts (wt.) |
|---|---|
| Moisture | 28.56 |
| Carbon | 60.85 |
| Hydrogen | 7.12 |
| Sulfur | 2.69 |
| Nitrogen | 0.48 |
| Oxygen | 0.09 |
| Ash | 0.21 |
|  | 100.00 |
| Btu per pound | 13,100 |
| Metals (ppm) |  |
| V | 324 |
| Ni | 74 |
| Fe | 14 |
| Na | 78 |
| Mg | 473 |
| Spec. Gravity (°API) | 8.6 |
| Flash Point, °C. | 102 |
| Distillation % vol IBP-343, °C. | 10.9 |
| Droplet Size Dist. Mean size, microns | 15.5 |
| Apparent Viscosity, (cP at 30° C.) |  |
| 10 l/s | 932 |
| 50 | 690 |
| 100 | 582 |

The combustion gases are treated with the $SO_x$-reducing agent in the same manner and at the same rate as above. $SO_x$ levels of 4.1 lbs/MMBtu are reduced by 60%. The total particulates in this case amounts to only 11.43 lbs per MMBtu of fuel fired. This represents only a 58% increase over the base coal ash loading of 7.2 lbs/MMBtu. Thus, the ratio of $SO_2$ removed per lb of particulates is increased to 0.21.

Thus, it will be apparent that the combination of combustion of fuel emulsions with furnace sorbent injection will typically result in a far lower solids loading to the furnace, heat exchange surfaces, backend, particulate collection devices and ash handling equipment than the combustion of coal of similar sulfur content and furnace sorbent injection. Thus, it will be possible to use low cost fuel emulsion and low cost furnace sorbent injection on coal-fired units without the need for costly upgrades in solids collection and handling and disposal devices while also meeting $SO_x$ emission targets without the need for costly scrubber technology.

The above description is for the purpose of teaching the person of ordinary skill in the art how to practice the invention, and it is not intended to detail all those obvious modifications and variations of it which will become apparent to the skilled worker upon reading the description. For example, the advantages of this invention have application to other hydrocarbons, including coal and other crudes and petroleum fractions. It is intended that all such reasonable modifications and variations be included within the scope of the invention, which is defined by the following claims.

I claim:

1. A process for decreasing $SO_x$ produced by a coal-fired boiler comprising a plurality of burners, the process comprising:
   providing as at least one of the burners, a burner capable of burning an emulsified, pumpable fuel;
   supplying to at least one of said burners an emulsified, pumpable fuel comprising from 10 to 70% of a continuous water phase and a discontinuous fluid hydrocarbon phase comprising at least 1% sulfur by weight;
   burning said fuel, thereby creating a combustion effluent including $SO_x$; and
   contacting the combustion effluent with a $SO_x$ sorbent selected from the group consisting of the hydroxides, oxides, and carbonates of calcium, magnesium, barium, sodium, and aluminum and mixtures of these.

2. A process according to claim 1 wherein at least a portion of the $SO_x$ sorbent is injected with the fuel.

3. A process according to claim 2 wherein a portion of the $SO_x$ sorbent is injected with the oil phase of the fuel.

4. A process according to claim 2 wherein a portion of the $SO_x$ sorbent is injected with the water phase of the fuel.

5. A process according to claim 1 wherein at least a portion of the $SO_x$ sorbent is injected as an aqueous mixture.

6. A process according to claim 1 wherein at least a portion of the $SO_x$ sorbent is injected dry into the combustion effluent.

7. A process according to claim 1 wherein at least a portion of the $SO_x$ sorbent is injected into a heat exchanger convective zone.

8. A process according to claim 1 wherein at least a portion of the $SO_x$ sorbent is injected into duct work after an air heater section.

9. A process according to claim 1 wherein the total solids loading through the boiler is less than 125% increase over the baseline coal ash loading.

10. A process of claim 9 wherein the oil-in-water emulsion fuel is of a bitumen-in-water type comprising 25 to 70% water, ash of 0.04 to 0.25%, sulfur of 2.4 to 2.9% and a heating value of 12,100 to 13,000 Btu/lbs.

11. A process of claim 9 wherein the sorbents are injected in the fuel prior to combustion; with the fuel in the combustion zone, in the heat exchanger convective zone; in a separate reactor zone; in the duct work after the air heater; or upstream of a particulate collection device.

12. A process of 9 wherein the oil-in-water emulsion fuel has been biologically treated prior to combustion to liberate organic sulfur from the fuel in a water-soluble sulfate form.

13. A process of claim 12 wherein the liberated sulfate is partially or completely reacted with the sorbents in the fuel prior to combustion.

14. A process of claim 9 wherein the oil-in-water emulsion and sorbent are used on a new boiler specifically to allow for minor modification to established coal-fired boiler design criteria.

* * * * *